US006993356B2

(12) United States Patent
Herzinger

(10) Patent No.: US 6,993,356 B2
(45) Date of Patent: Jan. 31, 2006

(54) FREQUENCY GENERATING SYSTEM FOR A MOBILE RADIO DUAL-BAND TRANSCEIVER

(75) Inventor: Stefan Herzinger, München (DE)

(73) Assignee: Infineon Technologies AG, München (DE)

( * ) Notice: Subject to any disclaimer, the term of this patent is extended or adjusted under 35 U.S.C. 154(b) by 811 days.

(21) Appl. No.: 09/977,786

(22) Filed: Oct. 15, 2001

(65) Prior Publication Data

US 2002/0061765 A1 May 23, 2002

Related U.S. Application Data

(63) Continuation of application No. PCT/DE00/01159, filed on Apr. 13, 2000.

(30) Foreign Application Priority Data

Apr. 13, 1999 (DE) ........................................ 199 16 574

(51) Int. Cl.
*H04B 1/16* (2006.01)
*H04B 1/38* (2006.01)

(52) U.S. Cl. ......................... 455/522; 455/517; 455/75; 455/103; 455/191.3

(58) Field of Classification Search .............. 455/552.1, 455/86, 188.1, 191.3, 192.1, 186.1, 522, 455/517, 103, 75, 77, 87
See application file for complete search history.

(56) References Cited

U.S. PATENT DOCUMENTS 4,246,539 A * 1/1981 Haruki et al. ................. 455/76
6,484,038 B1 * 11/2002 Gore et al. .............. 455/552.1
6,725,019 B2 * 4/2004 Higuchi ....................... 455/84
6,754,508 B1 * 6/2004 Pau ......................... 455/552.1
6,766,178 B1 * 7/2004 Damgaard et al. ....... 455/552.1

FOREIGN PATENT DOCUMENTS

| | | |
|---|---|---|
| DE | 195 32 069 A 1 | 1/1997 |
| DE | 196 18 243 A 1 | 11/1997 |
| EP | 0 678 974 A2 | 10/1995 |
| EP | 0 780 968 A1 | 6/1997 |
| WO | PCT WO 97/30523 | 8/1997 |

OTHER PUBLICATIONS

Richard McPartland et al.: "GSM–Baukasten" (GSM Modular), ElektronikPraxis, No. 16, Aug. 24, 1999, pp. 30–34.

"GSM 900 / DCS 1800 Reference Designs", *The Technology Partnership plc, Melbourn Science Park, Melbourn, Royston, Hertfordshire SG8 6EE, 5 pgs.*

"RF Devices for Mobile Cellular Phones", *04–027A, Hitachi, May 1998, 5 pgs.*

* cited by examiner

*Primary Examiner*—Curtis Kuntz
*Assistant Examiner*—Dionne Harvey
(74) *Attorney, Agent, or Firm*—Laurence A. Greenberg; Werner H. Stemer; Ralph E. Locher

(57) ABSTRACT

In a frequency generating system, a triple/single local-oscillator concept for receiving and transmitting in the lower frequency band, transmitting in the upper frequency band, and receiving in the upper frequency band is used for a dual-band transceiver so that a single band-switched VCO can be used as local oscillator for setting the frequency in all four possible operating cases. The system can be used, for example, in highly integrated dual-band mobile parts for GSM 900/1800 mobile radio.

11 Claims, 4 Drawing Sheets

FREQUENCY GENERATING SYSTEM FOR A MOBILE RADIO DUAL-BAND TRANSCEIVER

CROSS-REFERENCE TO RELATED APPLICATION

This application is a continuation of copending International Application No. PCT/DE00/01159, filed Apr. 13, 2000, which designated the United States.

BACKGROUND OF THE INVENTION

Field of the Invention

The invention relates to a frequency generating system for a mobile radio transceiver which can be optionally operated in two RF frequency bands (dual-band) which are far apart, specifically in the 900 MHz and 1800 MHz range, using two mutually offset local-oscillator frequency bands with the aid of which the transmit signal, conducted via an IF filter, is converted into an upper and lower transmit frequency band, respectively. The signal received in the upper and lower receive frequency band, respectively, is converted into a receive IF frequency, the frequency conversion into and, respectively, out of the upper band being effected with a lower local-oscillator frequency and into and, respectively, out of the lower band being effected with a higher local-oscillator frequency and a common highly selective IF filter being provided for filtering out the IF signal for both frequency bands at the receiving end.

It is known that the terminals implemented in the form of transceivers in mobile radio are currently being expanded to multi-band capability. Therefore both the transmitter and the receiver of the device are to be suitably operated with the least possible additional expenditure in radio-frequency signal processing.

The invention only relates to systems that, although they use different RF bands, have common modulation parameters, bandwidths etc. in both frequency bands, such as, for example, global system for mobile communications (GSM) 900 and GSM 1800. In the mobile radio field, dual-band concepts with bands having frequencies which are far apart, e.g. in the 900 MHz and 1800 MHz range, are pursued most frequently by far.

A total of four, generally different frequency bands are needed from the local oscillator in order to cover the four different cases of operation, namely receiving in the first frequency band, receiving in the second frequency band, transmitting in the first frequency band and transmitting in the second frequency band. Since the phase noise requirements for the RF oscillators, which are usually implemented by voltage-controlled oscillators (VCOs), are very high in digital transmission systems, four separate voltage-controlled oscillators must be used in the extreme case.

In most frequency generating systems for mobile radios, precalibrated VCO modules are used today. Due to the dimensions and their high price, these modules represent a decisive volume and cost factor. The space requirement of the components has a very high significance, especially in mobile radio, since the miniaturization has become a dominant factor, e.g. in the case of GSM mobile parts (cell phones). Since the mobile multi-band terminals must not differ from the usual single-band mobile radios with regard to their mechanical dimensions, the space situation is even tighter in the case of the multi-band devices.

In practice, every known frequency generating concept for mobile dual-band transceivers is aimed at minimizing the number of voltage-controlled oscillators needed. There are already a number of different approaches to this which, however, entail distinct disadvantages in practice at another place in the overall radio frequency (RF) system. These approaches will be presented briefly in the text that follows.

The following considerations are largely independent of the respective transmitter concept if only one intermediate frequency (IF) is used in the transmitter. The implementation of the transmitter itself can be quite different and does not change anything in the approaches and considerations discussed in the text that follows.

In principle, the frequency bands to be covered by voltage-controlled oscillators result from the frequency bands to be served and from the choice of the intermediate frequencies. A further factor is whether the frequency conversion takes place with a higher or with a lower local-oscillator frequency. Having defined a local-oscillator frequency range, four different intermediate frequencies are generally obtained in the dual-band transceiver.

In the receiving path, highly selective, and thus also relatively elaborate IF filters which, in most cases, are constructed as surface acoustic wave filters, are used in the usual manner for channel selection. It is, therefore, more efficient for the overall system if a common receive IF filter is used. In addition, the situation is also simplified if a lower local oscillator frequency is always used for the upper frequency band, that is to say, e.g. for the frequency range at 1800 MHz, and a higher local oscillator frequency is always used for the lower frequency band.

In allocating the frequency bands in a mobile radio, it is usual to make the transmit frequency lower than the receive frequency in a combined frequency band at the mobile part end. This type of association increases the efficiency of the transmitter output stage that has an advantageous effect on the current consumption.

This aspect is of particular importance at the mobile part end since it is desirable to manage with as small as possible battery capacity in the mobile parts in order to achieve a low weight and a small constructional size in these parts. If then two frequency bands are to be served, the transmitting and receiving configurations are not mirror-symmetrical to one another which makes it more difficult to choose the intermediate frequencies as is still to be shown in the text which follows.

In the text that follows, two approaches to a solution that have already been used previously are shown with reference to graphical representations shown in FIG. 1 and FIG. 2. The graphical representations interpreted in the text that follows only illustrate the approximate relationship between the frequency bands. The frequency bands are then defined exactly in each case by a detailed frequency plan configuration that takes into consideration, e.g. unwanted lower-order receiving points and mixing of the harmonics.

In the text that follows, the approaches to a solution hitherto used for a frequency generation using as few oscillators as possible are shown for a dual-band GSM transceiver for GSM 900 and GSM 1800. The frequency bands to be served in this case are in most cases predefined by an internationally regulated frequency allocation as in this case, also. The basic transceiver architecture can be found, for example, in the printed document titled "RF Devices for Mobile Cellular Phones", Hitachi, May 1998, 04-027A.

FIG. 1 shows a graphical representation for the approach to a solution that, with only one local-oscillator frequency band LO_0 is optimum from the point of view of frequency generation. In the example, a transmit frequency band Tx1 (lower transmit frequency band) for GSM 900 is between 880 and 915 MHz, a receive frequency band Rx1 (lower receive frequency band) for GSM 900 is between 925 and 960 MHz, a transmit frequency band Tx2 (upper transmit frequency band) for GSM 1800 is between 1710 and 1785 MHz and a receive frequency band Rx2 (upper receive frequency band) for GSM 1800 is between 1805 and 1880 MHz. The duplex frequency spacing $f_{duplex1}$ between the two bands is 45 MHz for GSM 900 whereas the duplex frequency spacing $f_{duplex2}$ between the two bands is 95 MHz for GSM 1800.

So that the same receive intermediate frequency IF_Rx of 440 MHz, and thus an identical IF filter, can be provided for both receive frequency bands Rx1 and Rx2, the local-oscillator frequency band LO_Rx1 for GSM 900 receive mode is between 1365 and 1400 MHz and the local-oscillator frequency band LO_Rx2 for GSM 1800 reception is between 1365 and 1440 MHz. The great disadvantage of this concept is the extremely high receive intermediate frequency IF_Rx which is about half the receive frequency of GSM 900.

In the case of GSM, it is no longer possible to implement a reasonable IF filter for reception using the usual surface acoustic wave technology. In addition, it must be noted that the respective receive frequency band Rx1 or Rx2 which is not served in the case of reception is in each case in a lower band of the receive frequency band which happens to be active. This results in additional problems in the practical implementation and in distinctly increased requirements for the shielding between the two receive branches for GSM 900 and GSM 1800. This contradicts the requirement for higher integration, e.g. in an integrated RF circuit chip for both frequency bands.

In the use of a single local-oscillator frequency band LO_0, between 1365 and 1400 MHz in the example, which forms the basis of the concept according to FIG. 1 and in which the local-oscillator frequency band LO_Tx1 for GSM 900 transmit mode is between 1365 and 1400 MHz and the local-oscillator frequency band LO_Tx2 for GSM 1800 transmit mode is between 1365 and 1440 MHz, the transmit intermediate frequencies IF_Tx1 and IF_Tx2 for the lower and the upper transmit frequency band Tx1 and Tx2 automatically differ by the sum of the duplex frequency spacings $f_{duplex1}$=45 MHz and $f_{duplex2}$=95 MHz, respectively, i.e. by 45+95 MHz=140 MHz in the example. In the transmitter it is important that the third harmonic of the transmit intermediate frequency can be suppressed strongly in each case with the least possible filter expenditure. The further apart the transmit intermediate frequencies IF_Tx1 and IF_Tx2 are in terms of percentage, the more difficult it becomes to achieve this goal since the frequency band for accommodating the further edge becomes smaller and smaller.

The following holds true in this case:

top pass frequency: IF_Tx1=485 MHz;

bottom 3rd harmonic: 3*IF_Tx2=1035 MHz;

relative filter stop frequency: Ωs=1035/485=2.13.

Such a filter can still be implemented with low-order LC elements with tolerance.

FIG. 2 shows a graphical representation of an approach to a solution that is no longer optimum from the point of view of frequency generation, with two local-oscillator frequency bands LO_1 and LO_2. In the example shown for this concept, the transmit frequency bands Tx1 and Tx2 for GSM 900 transmit mode and GSM 1800 transmit mode, respectively, and the receive frequency bands Rx1 and Rx2 for GSM 900 receive mode and GSM 1800 receive mode, respectively, and thus also the duplex frequency spacings $f_{duplex1}$ and $f_{duplex2}$, are exactly the same as in FIG. 1. In the concept shown in FIG. 2, however, the basis is an easily implemented and managed receive intermediate frequency IF_Rx which can be selected independently of the position of the frequency bands and is the same for both receive frequency bands. In the example shown, the receive intermediate frequency IF_Rx is 280 MHz for both receive frequency bands Rx1 and Rx2, for which an identical IF filter is provided.

The local-oscillator frequency band LO_Rx1 for GSM 900 receive mode, which corresponds to the lower local-oscillator frequency band LO_1, is between 1205 and 1240 MHz, and the local-oscillator frequency band LO_Rx2 for GSM 1800, which corresponds to the upper local-oscillator frequency band LO_2, is between 1525 and 1600 MHz.

In the use of two local-oscillator frequency bands LO_1 and LO_2, which forms the basis of the concept in FIG. 2 and which correspond to the local-oscillator frequency band LO_Tx1 for GSM 900 transmit mode between 1205 and 1240 MHz and, respectively, the local-oscillator frequency band LO_Tx2 for GSM 1800 transmit mode between 1525 and 1600 MHz, the transmit intermediate frequencies IF_Tx1 and IF_Tx2 for the lower and for the upper transmit frequency band Tx1 and Tx2, respectively, also automatically differ by the sum of the duplex frequency spacings $f_{duplex1}$=45 MHz and $f_{duplex2}$=95 MHz, respectively, that is to say by 45+95 MHz=140 MHz in the example. The transmit intermediate frequency IF_Tx1 for the lower band is 325 MHz and the transmit intermediate frequency IF_Tx2 for the upper band is 185 MHz. Looking more closely at the transmitter, however, the following is obtained:

top pass frequency: IF_Tx1=325 MHz;

bottom 3rd harmonic: 3*IF_Tx2=555 MHz;

relative filter stop frequency: Ωs=555/325=1.7.

The transmit IF filtering necessary here can only be achieved with greatly increased expenditure. Depending on the tolerances, a switchable transmit IF filter is required which greatly increases the complexity, the costs and the space requirement. It is true that the filtering in the transmit branch can be relaxed if the receive IF is increased in the above example. In the limit case, this concept then changes into the approach to a solution shown in conjunction with FIG. 1, i.e. a compromise must always been made between too high a receive intermediate frequency and problems in the transmit signal filtering.

FIG. 3 shows a block diagram of a circuit for frequency generation in a dual-band transceiver with two local-oscillator frequency bands. In a dual-band transmitter 1, the transmit signal is conducted via a common IF filter 2 at an intermediate frequency and then converted into the lower or into the upper RF transmit band frequency by a mixing stage 3 which is optionally supplied with the output signals of the two voltage-controlled oscillators VCO1 and VCO2 which are used as local oscillators.

The transmit signal present in the lower or upper transmit frequency band Tx1 and Tx2, respectively, is then supplied via an antenna switch 4 to an antenna 5 for radio emission. In the receiving case, the receive signal in the lower or upper receive frequency band Rx1 or Rx2, respectively, which is absorbed by the antenna 5 and conducted by the antenna switch 4, is converted in a dual-band receiver 6 into the intermediate frequency in a mixing stage 7 for the lower frequency band or in a mixing stage 8 for the upper frequency band, respectively, and conducted by a common intermediate frequency filter 9.

The mixing stages 7 and 8 receive local-oscillator signals either from the voltage-controlled oscillator VCO1 for the upper frequency band or from the voltage-controlled oscillator VCO2 for the lower frequency band, for carrying out the conversion of the respective receive signal into the intermediate frequency. The two voltage-controlled oscillators VCO1 and VCO2 are part of a phase-locked loop PLL with a low-pass loop filter LF.

In International Patent Disclosure WO 97/30523 A, a dual-mode radio frequency transceiver architecture is specified. In this configuration, two local oscillators are preferably provided for frequency conversion.

SUMMARY OF THE INVENTION

It is accordingly an object of the invention to provide a frequency generating system for a mobile radio dual-band transceiver that overcomes the above-mentioned disadvantages of the prior art devices of this general type, which is to be constructed with high integration in a very narrow space and in which only a single voltage-controlled oscillator is to be used without producing increased expenditure at another place in the transceiver or reducing the ruggedness against production tolerances in the overall system.

With the foregoing and other objects in view there is provided, in accordance with the invention, a frequency generating system for a mobile radio transceiver operating in two radio frequency (RF) bands spaced apart from each other. The frequency generating system contains a transmitter having an intermediate frequency (IF) filter, a receiver having a common highly selective IF filter, and a single voltage controlled oscillator (VCO) connected to the transmitter and the receiver. The voltage controlled oscillator outputs two mutually offset local-oscillator frequency bands including a lower local-oscillator frequency band and a higher local-oscillator frequency band having a higher frequency than the lower local-oscillator frequency band. The transmitter generates a transmit signal, conducted through the IF filter, and with an aid of the lower local-oscillator frequency band the transmit signal is converted into an upper transmit frequency band and a lower transmit frequency band, respectively. A signal received in an upper receive frequency band and a lower receive frequency band, respectively, in the receiver is converted with an aid of the two mutually offset local-oscillator frequency bands into a receive IF. A frequency conversion into and, respectively, out of an upper band is effected with the lower local-oscillator frequency band and into and, respectively, out of a lower band is effected with the higher local-oscillator frequency band. The common highly selective IF filter is provided for filtering out an IF signal for both the upper band and the lower band in the receiver. The higher local-oscillator frequency band is exclusively provided for converting the upper receive frequency band into the receive IF and the lower local-oscillator frequency band is provided both for converting the lower receive frequency band into the receive IF and also for converting the transmit signal from an IF into a RF transmit frequency in the upper transmit frequency band and the lower transmit frequency band. An upper transmit IF for conversion into the upper transmit frequency band is identical to a lower transmit IF for conversion into the lower transmit frequency band. A percentage frequency difference between the two mutually offset local-oscillator frequency bands is of such a magnitude that both the lower and higher local-oscillator frequency bands can be generated by the single voltage-controlled oscillator functioning as a local oscillator. The voltage-controlled oscillator having a resonator which is electronically switched in a manner of a so-called "band-switched" VCO during band switching without significant impairment of noise characteristics in at least one of the upper and lower local-oscillator frequency bands.

According to the invention, which relates to the frequency generating system for a mobile radio transceiver of the type initially mentioned, the object is achieved in that the upper local-oscillator frequency band is exclusively provided for converting the upper receive frequency band into the receive IF and the lower local-oscillator frequency band is provided both for converting the lower receive frequency band into the common receive IF and also for converting the transmit signal from the IF into the RF transmit frequency in the upper or lower transmit frequency band, respectively, the transmit IF for conversion into the upper frequency band being identical to the transmit IF into the lower frequency band, and that the percentage frequency difference between the two mutually offset local-oscillator frequency bands is of such a magnitude that both local-oscillator frequency bands can be generated with a single voltage-controlled oscillator (VCO) as the local oscillator, the resonator of which is electronically switched in the manner of the so-called "band-switched" VCO during band switching without significant impairment of the noise characteristics in at least one of the frequency bands. Using the frequency generating system specified by the invention, with the triple/single local-oscillator concept simplifies the frequency generation strongly for transmitting/receiving in the upper/lower band.

The frequency generating concept specified by the invention is optimum not only with regard to the filtering in the receive path in which a common IF exists for both frequency bands and an identical receive IF filter can be used, therefore, but also with respect to the filtering in the transmit path. Although a common receive IF is used as a basis, the transmit IF is also identical for both frequency bands. This provides for very effective transmit filtering.

In accordance with an added feature of the invention, the percentage frequency difference between the two mutually offset local-oscillator frequency bands is at most 10%.

In accordance with an additional feature of the invention, a first frequency spacing between a lower end of the lower receive frequency band and a lower end of the lower local-oscillator frequency band is equal to a second frequency spacing between an upper end of the upper receive frequency band and an upper end of the higher local-oscillator frequency band. The first frequency spacing and the second frequency spacing are in each case equal to the receive IF which is common to the upper and lower bands. A third frequency spacing between a lower end of the lower transmit frequency band and the lower end of a range of the lower local-oscillator frequency band used for transmitting in the lower frequency range is equal to a fourth frequency spacing between an upper end of the upper transmit frequency band and the upper end of the lower local-oscillator frequency band. The third frequency spacing and the fourth frequency spacing are in each case equal to the transmit IF which is common to the two bands and is identical. The transmit IF is equal to a sum of the receive IF, a duplex frequency corresponding to an offset between the lower transmit frequency band and the lower receive frequency band and a difference frequency which corresponds to approximately half a difference between a width of the upper transmit frequency band and a width of the lower transmit frequency band.

In accordance with another feature of the invention, the lower local-oscillator frequency band has a width corresponding to the width of the upper transmit frequency band. A range of the lower transmit frequency band is centrally located in the range of the lower local-oscillator frequency band used for conversion. The range of the lower local-oscillator frequency band used for converting the lower receive frequency band is disposed at the lower end.

In accordance with a further feature of the invention, the widths of the lower transmit frequency band and the lower receive frequency band are identical to one another and that widths of the upper transmit frequency band and the upper receive frequency band are also identical to one another.

In accordance with a further added feature of the invention, the lower transmit frequency band is at a first fixed frequency spacing below the lower receive frequency band and the upper transmit frequency band is at a second fixed frequency spacing below the upper receive frequency band.

In accordance with a further additional feature of the invention, the lower transmit frequency band has a range of 880–915 MHz, the lower receive frequency band has a range of 925–960 MHz, the upper transmit frequency band has a range of 1710–1785 MHz, and the upper receive frequency band has a range of 1805–1880 MHz.

In accordance with another further feature of the invention, the two mutually offset local-oscillator frequency bands have a width of in each case 75 MHz, the receive IF is 360 MHz and the transmit IF is 425 MHz.

In accordance with another added feature of the invention, the voltage controlled oscillator receives a logic signal which deviates from a band switching signal, a state of the logic signal depending on an operating mode to be switched on and is provided for selecting between which of the two mutually offset local-oscillator frequency bands is output.

In accordance with another additional feature of the invention, the transmitter, the receiver and the voltage-controlled oscillator are embedded in a integrated circuit chip.

In accordance with a concomitant feature of the invention, the two RF bands are in the 900 MHz and 1800 MHz range.

Other features which are considered as characteristic for the invention are set forth in the appended claims.

Although the invention is illustrated and described herein as embodied in a frequency generating system for a mobile radio dual-band transceiver, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
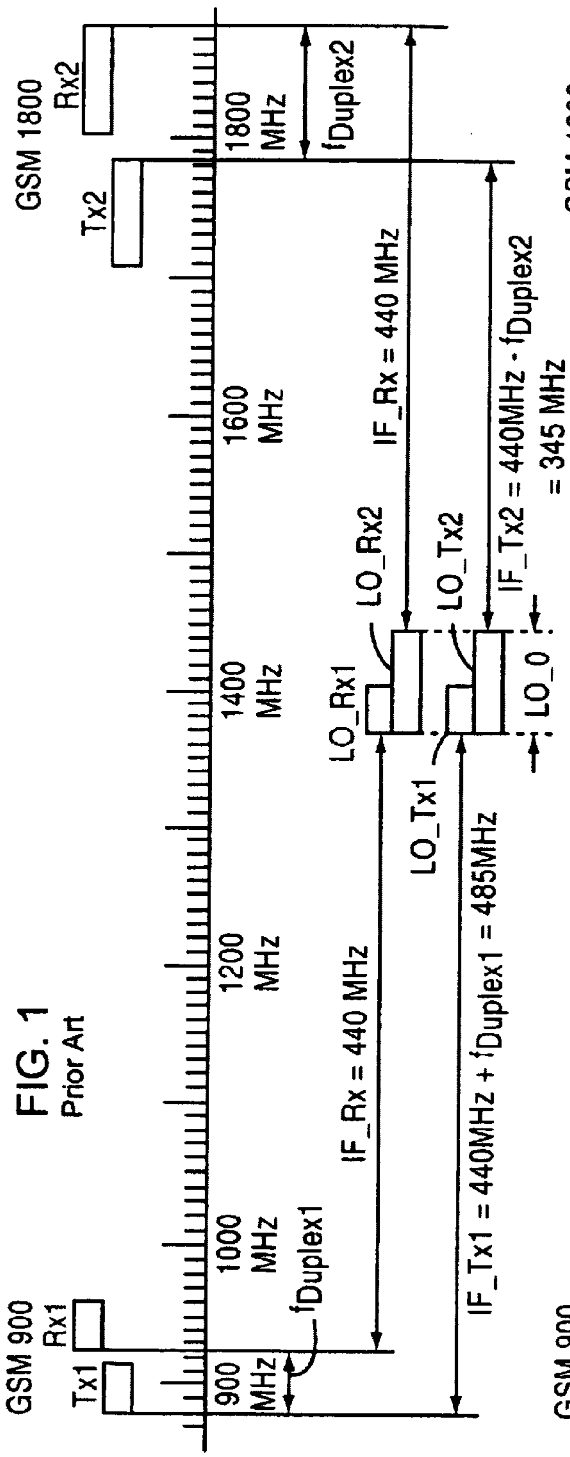
FIG. 1 is a graphical representation of frequency bands of a known frequency generating system for a dual-band mobile radio transceiver that has only one local-oscillator frequency band.
Figure 2:
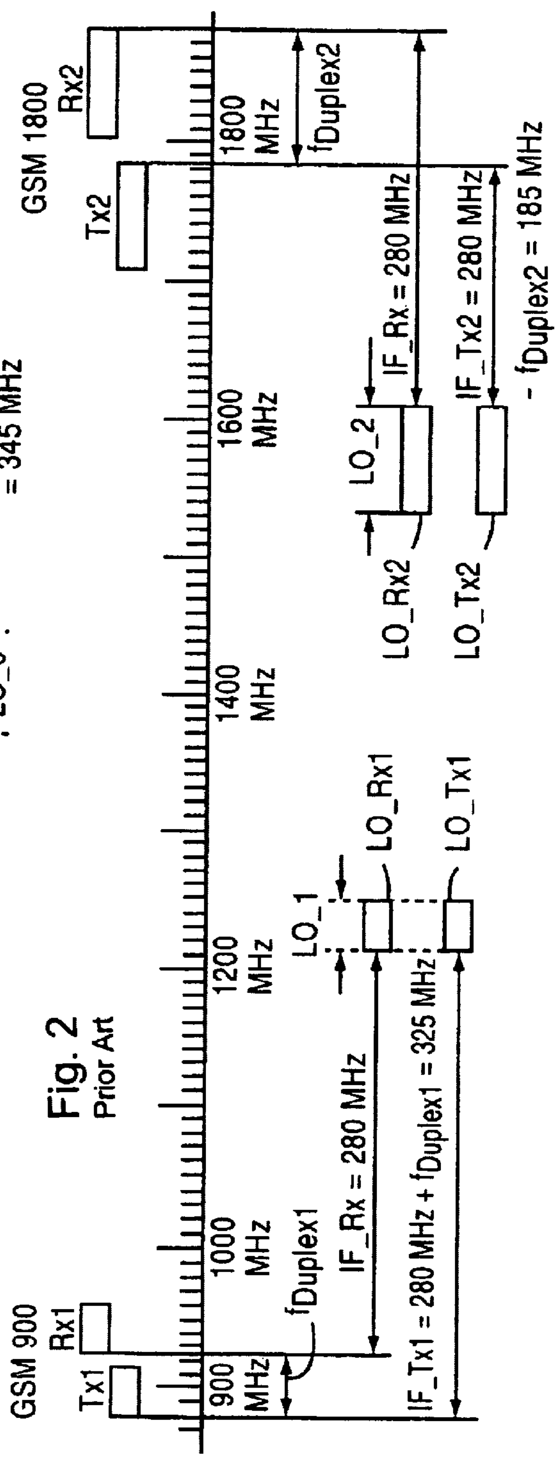
FIG. 2 is a graphical representation of frequency bands of a known frequency generating system for the dual-band mobile radio transceiver that has two local-oscillator frequency bands.
Figure 3:
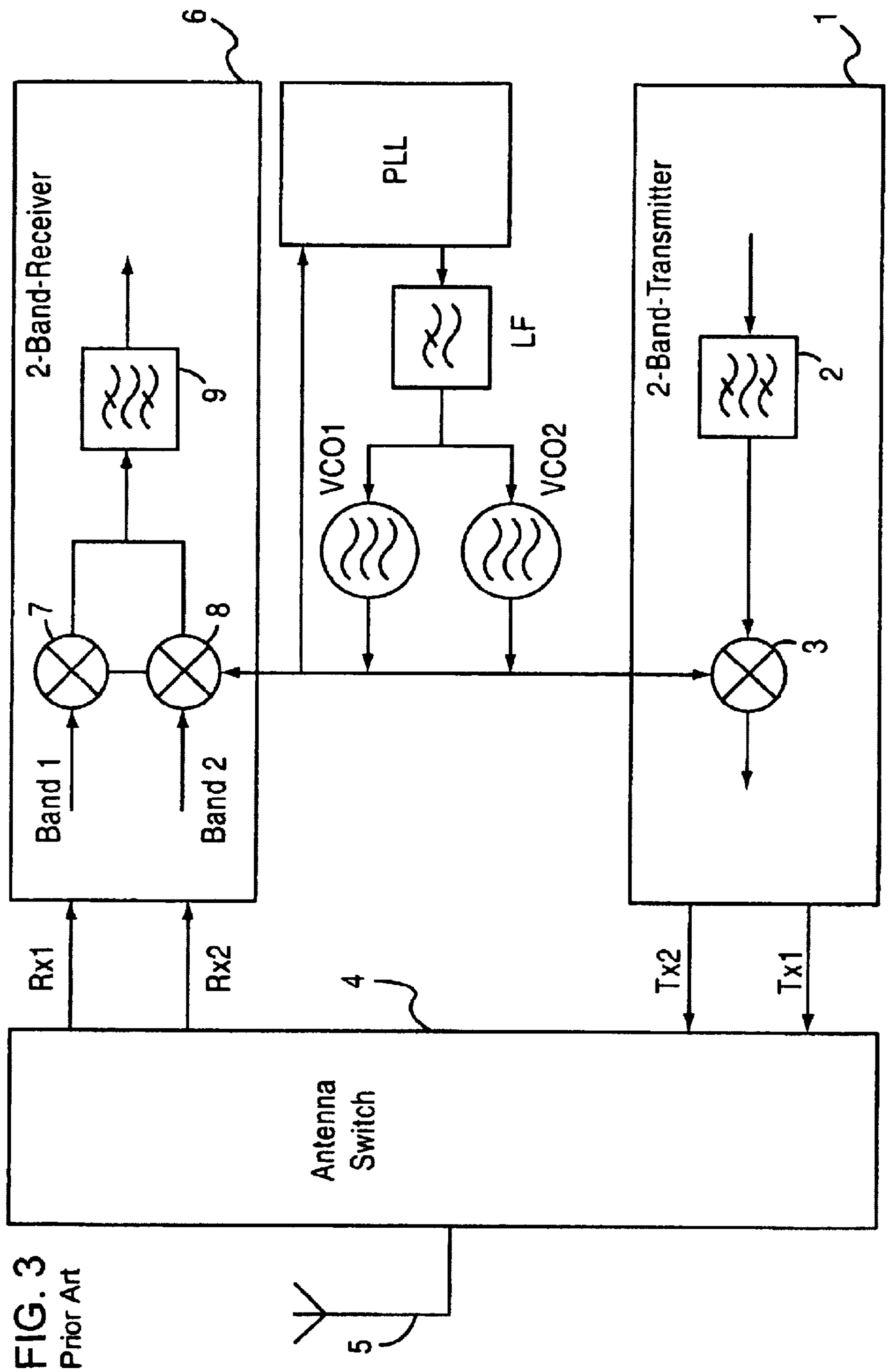
FIG. 3 is a block diagram of a known frequency generating system for the dual-band mobile radio transceiver which has the two local-oscillator frequency bands.
Figure 4:
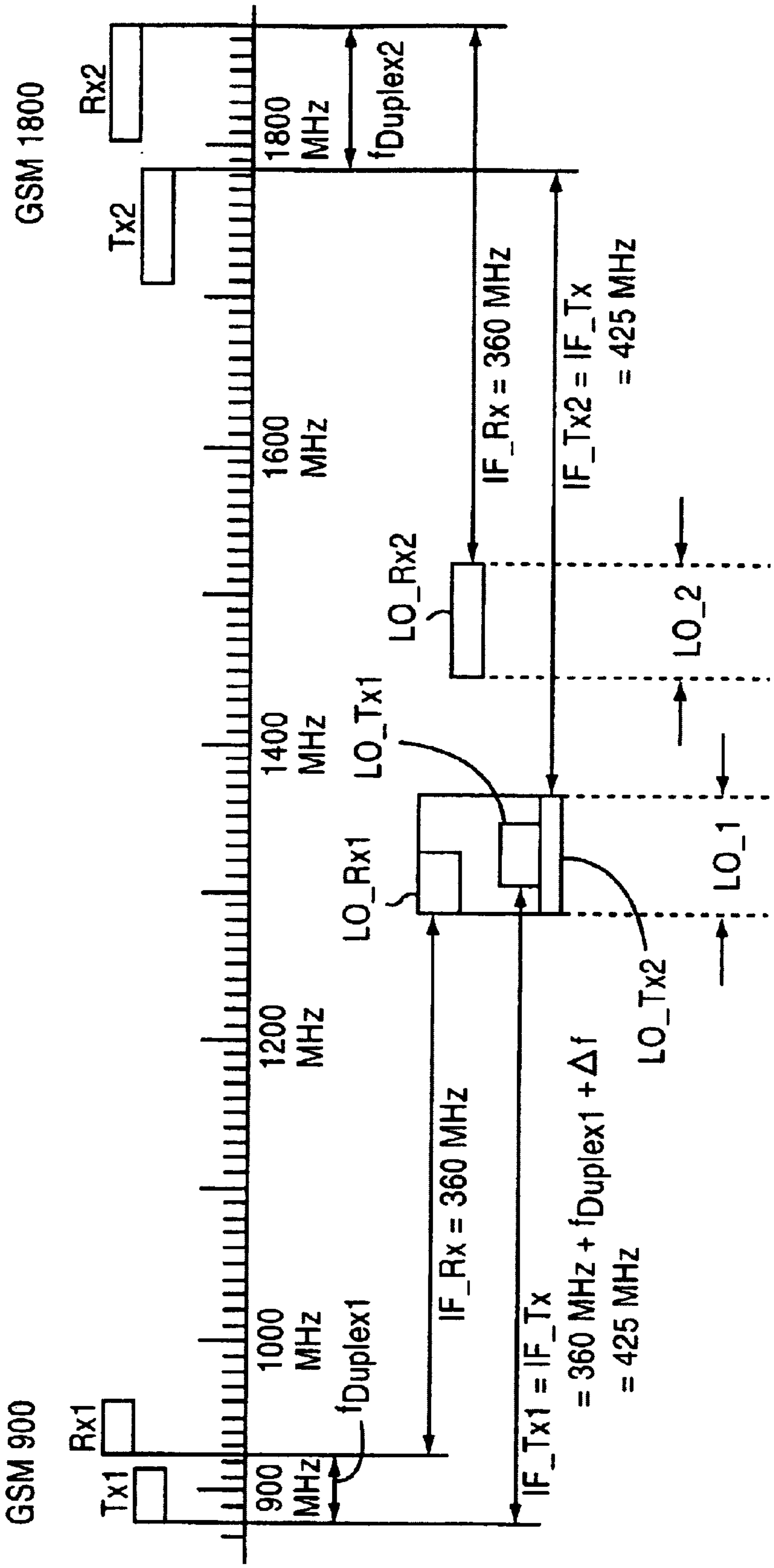
FIG. 4 is a graphical representation of frequency bands of a frequency generating system for a dual-band mobile radio transceiver according to the invention which has two local-oscillator frequency bands but only one voltage-controlled oscillator as local oscillator.

Referring now to the figures of the drawing in detail and first, particularly, to FIG. 4 thereof, there is shown a graphical representation of a frequency generating concept with two local-oscillator frequency bands LO_1 and LO_2 which, however, in contrast to the known concept according to FIG. 2, are configured and disposed in such a skillful manner that only a single voltage-controlled oscillator is required. In the example, a transmit frequency band Tx1 for GSM 900 transmit mode is between 880 and 915 MHz, a receive frequency band Rx1 for GSM 900 receive mode is between 925 and 960 MHz, a transmit frequency band Tx2 for GSM 1800 transmit mode is between 1710 and 1785 MHz and a receive frequency band Rx2 for GSM 1800 receive mode is between 1805 and 1880 MHz.

Thus, the duplex frequency spacing $f_{duplex1}$ between the two bands for GSM 900 is 45 MHz whereas the duplex frequency spacing $f_{duplex2}$ between the two bands for GSM 1800 is 95 MHz. For both receive frequency bands Rx1 and Rx2, the same receive intermediate frequency IF_Rx of 360 MHz, and thus an identical IF filter, is provided. Compared with that of the known dual-band concept according to FIG. 2, the receive intermediate frequency IF_Rx is thus increased.

The local-oscillator frequency band LO_Rx1 for GSM 900 receive mode is between 1285 and 1320 MHz and the local-oscillator frequency band LO_Rx2 for GSM 1800 receive mode, which corresponds to the upper local-oscillator frequency band LO_2, is between 1445 and 1520 MHz. The receive intermediate frequency IF_RX can be easily managed and the IF filter can still be implemented in surface acoustic wave technology without any problems.

The receive frequency band Rx1 or, respectively, Rx2 not served in the case of reception is not in the image band of the receive frequency band currently active. As a result, there are no additional problems or distinctly increased requirements for the shielding between the two receive branches for GSM 900 and GSM 1800 in the practical implementation, which would be inconsistent with the requirement for higher integration, for example in an integrated RF circuit chip for both frequency bands.

In using two local-oscillator frequency bands LO_1 and LO_2, which is the basis of the concept according to the invention according to FIG. 4, not only has the filtering in the receive path been very advantageously handled but the filtering in the transmit path is also optimum. Although this concept is based on a common receive intermediate frequency IF_Rx, the transmit intermediate frequencies IF_Tx1 for the lower frequency band and IF_Tx2 for the upper frequency band are also identical, i.e. IF_Tx1=IF_Tx2=IF_Tx. Thus, the transmit filtering can be realized very efficiently by a single transmit IF filter for the intermediate frequency IF_Tx.

The upper local-oscillator frequency band LO_2 used once exactly covers the local-oscillator frequency band LO_Rx2 for GSM 1800 receive mode. The lower local-oscillator frequency band LO_1 which is used a total of three times and which is drawn shaded in FIG. 4 exactly covers the local-oscillator frequency band LO_Tx2 for GSM 1800 transmit mode and extends from 1285 to 1360 MHz. The local-oscillator frequency band LO_Rx1 for GSM 900 reception, which is located between 1285 and 1320 MHz, is at the lower end of the lower local-oscillator frequency band LO_1.

The local-oscillator frequency band LO_Tx1 for GSM 900 transmit mode is disposed in the lower local-oscillator frequency band LO_1 in such a manner that an intermediate frequency IF_Tx1 results which is identical with the intermediate frequency IF_Tx2 for the GSM 1800 transmit mode, i.e. IF_Tx1=IF_Tx2=IF_Tx.

In the exemplary embodiment shown in FIG. 4, the common intermediate frequency IF_Tx for the transmit mode is 425 MHz. The intermediate frequency IF_Tx1 corresponding to the frequency IF_Tx is composed of the sum of the common intermediate frequency IF_Rx for the GSM 900 and GSM 1800 receive mode, 360 MHz in the example, the duplex frequency spacing $f_{duplex1}$ in the lower frequency band, 45 MHz in the example, and a frequency difference Δf, 20 MHz in the example.

Widening the lower local-oscillator frequency band LO_1 in the example shown in FIG. 4 does not present a problem in the implementation since the tuning slope of the voltage-controlled oscillator is used for the transmit mode in the upper frequency band, in any case, and the same resonator is used in the lower frequency band.

The only difference required in the implementation is an additional logic signal that selects the relevant local-oscillator frequency band LO_1 or LO_2 depending on the operating mode. The logic signal is configured in such a way that the lower local-oscillator frequency band LO_1 is used when transmitting in the lower and upper frequency band and also when receiving in the lower frequency band (triple band utilization) whereas the upper local-oscillator frequency band LO_2 is switched on when receiving in the upper frequency band (single band utilization). The frequency band switching signal (900/1800 MHz) which is always present cannot be used for this purpose.

The percentage frequency difference between the lower local-oscillator frequency band LO_1 and the upper local-oscillator frequency band LO_2 is relatively small so that the two frequency bands LO_1 and LO_2 can be served with a single voltage-controlled oscillator, a resonator of which is electronically "shortened", and thus switched over during the band switching. Such a switchable voltage-controlled oscillator is a so-called "band-switched" VCO. If the frequency difference is too great (>approx. 10%), the noise characteristics can become considerably worse in at least one of the two frequency bands.

Figure 5:
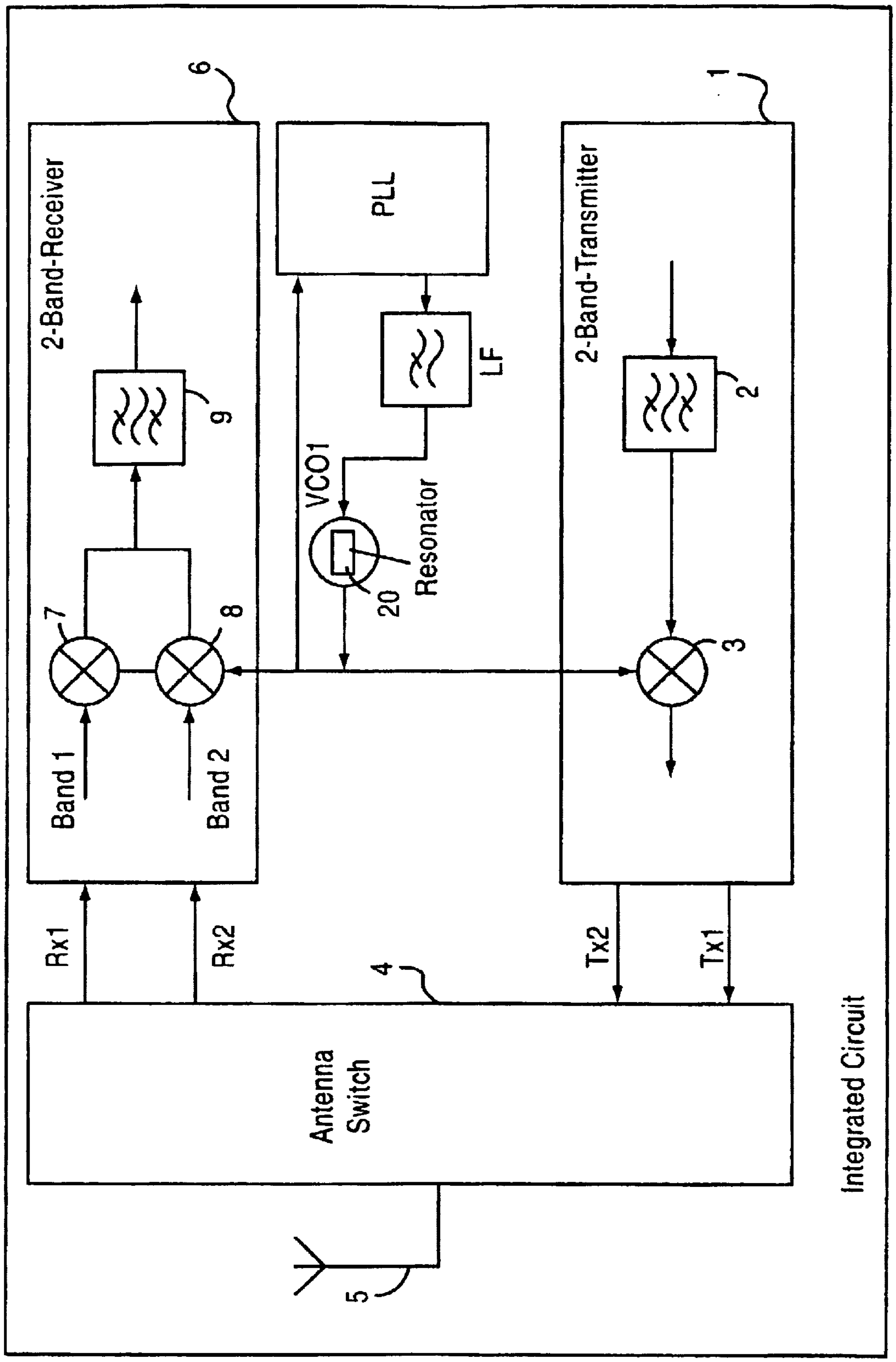
FIG. 5 is a block diagram of a frequency generating system for a dual-bands mobile radio transceiver according to the present invention.

FIG. 5 is a block diagram of a frequency generating system for a dual-band mobile radio transceiver according to the present invention, which has a single voltage controlled oscillator (VGO) connected to the transmitter and the receiver. The single voltage controlled oscillator has a resonator 20.

I claim:

1. A frequency generating system for a mobile radio transceiver operating in two radio frequency (RF) bands spaced apart from each other, comprising:

a transmitter having an intermediate frequency (IF) filter;

a receiver having a common highly selective IF filter; and a single voltage controlled oscillator (VCO) connected to said transmitter and said receiver, said voltage controlled oscillator outputting two mutually offset local-oscillator frequency bands including a lower local-oscillator frequency band and a higher local-oscillator frequency band having a higher frequency than the lower local-oscillator frequency band, said transmitter generates a transmit signal, conducted through said IF filter, and with an aid of the lower local-oscillator frequency band the transmit signal is converted into an upper transmit frequency band and a lower transmit frequency band, respectively, and a signal received in an upper receive frequency band and a lower receive frequency band, respectively, in said receiver is converted with an aid of the two mutually offset local-oscillator frequency bands into a receive IF, a frequency conversion into and, respectively, out of an upper band being effected with the lower local-oscillator frequency band and into and, respectively, out of a lower band being effected with the higher local-oscillator frequency band, said common highly selective IF filter being provided for filtering out an IF signal for both the upper band and the lower band in said receiver, the higher local-oscillator frequency band exclusively provided for converting the upper receive frequency band into the receive IF and the lower local-oscillator frequency band provided both for converting the lower receive frequency band into the receive IF and also for converting the transmit signal from an IF into a RF transmit frequency in the upper transmit frequency band and the lower transmit frequency band, an upper transmit IF for conversion into the upper transmit frequency band being identical to a lower transmit IF for conversion into the lower transmit frequency band, and that a percentage frequency difference between the two mutually offset local-oscillator frequency bands is of such a magnitude that both the lower and higher local-oscillator frequency bands can be generated by said single voltage-controlled oscillator functioning as a local oscillator, said voltage-controlled oscillator having a resonator which is electronically switched in a manner of a so-called "band-switched" VCO during band switching without significant impairment of noise characteristics in at least one of the upper and lower local-oscillator frequency bands.

2. The frequency generating system according to claim 1, wherein the percentage frequency difference between the two mutually offset local-oscillator frequency bands is at most 10%.

3. The frequency generating system according to claim 1, wherein:

a first frequency spacing between a lower end of the lower receive frequency band and a lower end of the lower local-oscillator frequency band is equal to a second frequency spacing between an upper end of the upper receive frequency band and an upper end of the higher local-oscillator frequency band;

the first frequency spacing and the second frequency spacing are in each case equal to the receive IF which is common to the upper and lower bands;

a third frequency spacing between a lower end of the lower transmit frequency band and the lower end of a range of the lower local-oscillator frequency band used for transmitting in the lower frequency range is equal to a fourth frequency spacing between an upper end of a range of the upper transmit frequency band and the upper end of a range of the lower local-oscillator frequency band; and the third frequency spacing and the fourth frequency spacing are in each case equal to the transmit IF which is common to the two bands and is identical, the transmit IF is equal to a sum of the receive IF, a duplex frequency corresponding to an offset between the lower transmit frequency band and the lower receive frequency band and a difference frequency which corresponds to approximately half a difference between a width of the upper transmit frequency band and a width of the lower transmit frequency band.

4. The frequency generating system according to claim 3, wherein:

the lower local-oscillator frequency band has a width corresponding to the width of the upper transmit frequency band;

a range of the lower transmit frequency band is centrally located in the range of the lower local-oscillator frequency band used for conversion; and the range of the lower local-oscillator frequency band used for converting the lower receive frequency band is disposed at the lower end.

5. The frequency generating system according to claim 1, wherein widths of the lower transmit frequency band and the lower receive frequency band are identical to one another and that widths of the upper transmit frequency band and the upper receive frequency band are also identical to one another.

6. The frequency generating system according to claim 5, wherein:

the lower transmit frequency band has a range of 880–915 MHz;

the lower receive frequency band has a range of 925–960 MHz;

the upper transmit frequency band has a range of 1710–1785 MHz; and the upper receive frequency band has a range of 1805–1880 MHz.

7. The frequency generating system according to claim 6, wherein the two mutually offset local-oscillator frequency bands have a width of in each case 75 MHz, the receive IF is 360 MHz and the transmit IF is 425 MHz.

8. The frequency generating system according to claim 1, wherein the lower transmit frequency band is at a first fixed frequency spacing below the lower receive frequency band and the upper transmit frequency band is at a second fixed frequency spacing below the upper receive frequency band.

9. The frequency generating system according to claim 1, said voltage controlled oscillator receiving a logic signal which deviates from a band switching signal, a state of the logic signal depending on an operating mode to be switched on and is provided for selecting between which of the two mutually offset local-oscillator frequency bands is output.

10. The frequency generating system according to claim 1, including an integrated circuit chip and said transmitter, said receiver and said voltage controlled oscillator are embedded in said integrated circuit chip.

11. The frequency generating system according to claim 1, wherein the two RF bands are in the 900 MHz and 1800 MHz range.

* * * * *